United States Patent [19]

Kim

[11] Patent Number: 4,985,049
[45] Date of Patent: Jan. 15, 1991

[54] MANUFACTURING SOLID FUEL

[76] Inventor: Jung B. Kim, 32-103 Ebiyacho, Oyukichodori, Sanjosagaru, Nakagyo-ku, Kyoto City, Kyoto, Japan

[21] Appl. No.: 339,830

[22] Filed: Apr. 18, 1989

[51] Int. Cl.$^5$ .............................................. B10B 11/00
[52] U.S. Cl. ........................................ 44/629; 44/636; 100/243
[58] Field of Search ............. 44/629, 589, 605, 11–13; 34/57 B, 243 R; 100/243 R

[56] References Cited

U.S. PATENT DOCUMENTS

| | | | |
|---|---|---|---|
| 3,506,414 | 4/1970 | Skendrovic | 44/605 |
| 4,344,769 | 8/1982 | Puff et al. | 44/629 |

FOREIGN PATENT DOCUMENTS

| | | | |
|---|---|---|---|
| 164052 | 12/1985 | European Pat. Off. | 44/589 |
| 29895 | 2/1983 | Japan | 44/589 |

Primary Examiner—Carl F. Dees
Attorney, Agent, or Firm—Armstrong, Nikaido, Marmelstein, Kubovcik & Murray

[57] ABSTRACT

An apparatus for manufacturing solid fuel from industrial waste includes a means for providing a first combustible material derived from a main material in the form of a sludge having a high water content, which includes means for reducing the water content, means for providing an auxiliary flammable material, and means for receiving the two materials, for mixing them by kneading and for drying them to produce a flaky solid fuel.

6 Claims, 4 Drawing Sheets

MANUFACTURING SOLID FUEL

SUMMARY OF THE INVENTION

This invention relates to an apparatus for manufacturing solid fuel comprising of means for squeezing out the water from high water content industrial waste and a kneading machine for kneading dewatered industrial waste with other industrial waste including flammable liquid, which makes flaky solid fuel at a low cost that burns without exhausting poisonous gas.

BACKGROUND OF THE INVENTION

The water content of pulp sludge (pulp sludge means sludge wasted from a pulp beating process) is more than 80% by weight, which generally made if impossible to incinerate pulp sludge using fuel oil.

Therefore, in the past pulp sludge could only be incinerated after being dried or could be utilized for reclamation to dispose of it.

However, such means were remarkably troublesome because incinerating with fuel oil or conveying for reclamation cost too much and there was the possibility that poisonous gas which was exhausted by incinerating might destroy the environment.

On the other hand, in Japan, much effort has been required to ensure adequate energy sources for the reason of being mainly dependent on imported natural energy sources.

To solve such problems as described above, there has been a long felt need for developing the means that is capable of profitably utilizing industrial waste for energy sources.

OBJECTS OF THE INVENTION

It is therefore a general object of this invention to provide an apparatus for manufacturing solid fuel, which can manufacture industrial waste into useful solid fuel.

The above and further objects and novel features of the invention will more fully appear from the following detailed description when the same is read in connection with the accompanying drawings.

It is to be expressly understood, however, that the drawings are for purpose of illustration only and are not intended as a definition of the limits of the invention.

DETAILED DESCRIPTION OF THE INVENTION

A detailed description of one embodiment of the present invention will be made with reference to FIG. 1.

Figure 1:
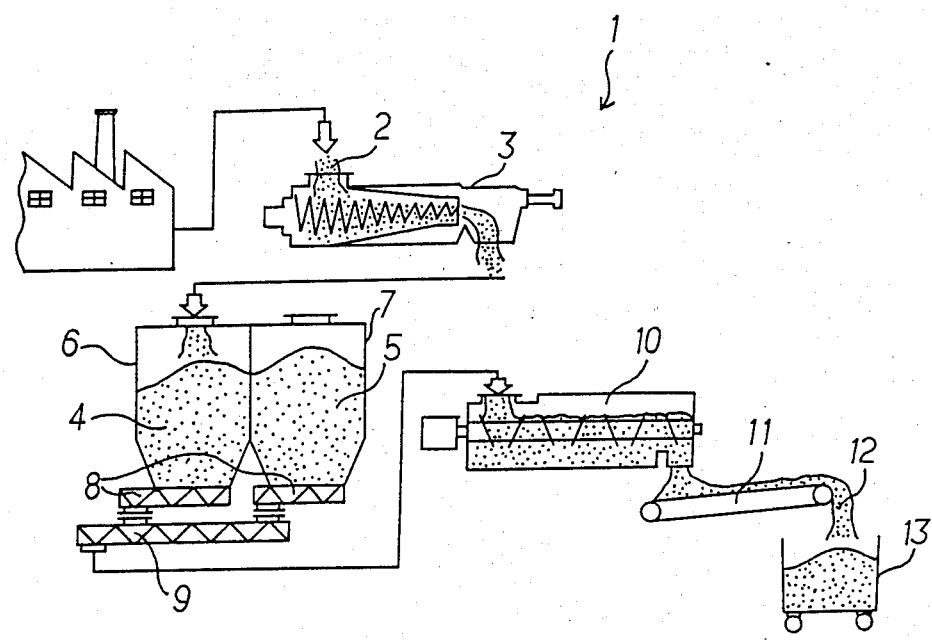
FIGS. 1 to 3 are schematic diagrams for explaining the apparatus for manufacturing solid fuel of each of several embodiment relating to the present invention, and FIG. 4 schematically illustrates the dryer which is comprised in the apparatus for manufacturing solid fuel of each embodiment relating to the present invention.

FIG. 1 shows one embodiment of components of an apparatus for manufacturing solid fuel 1 relating to the present invention.

Numeral 2 indicates main raw material, which is industrial waste such as pulp sludge including cellulose, which has a high water content.

Numeral 3 indicates a dryer which treats the main raw material 2 for dewatering.

Numeral 4 indicates dewatered sludge which is the main raw material 2 treated by the dryer 3.

Numeral 5 indicates auxiliary material which is other industrial waste, including an flammable liquid such as residue produced by petroleum refining.

Numeral 6 indicates a hopper feeding dewatered sludge 4.

Numeral 7 indicates a hopper feeding auxiliary material 5.

Numeral 8 indicates a screw feeder positioned under each of the hoppers 6 and 7.

Numeral 9 indicates a screw conveyor.

Numeral 10 indicates a kneading machine.

Numeral 11 indicates a belt conveyor.

Numeral 12 indicates flaky solid fuel obtained by kneading the main raw material 2 and the auxiliary material 5.

Numeral 13 indicates a storage vessel.

The embodiment of the apparatus for manufacturing solid fuel 1 will be now explained.

Dewatered sludge 4 is obtained by treating main raw material 2 for dewatering by the dryer 3.

Dewatered sludge 4 and auxiliary material 5 are stored in each of the hoppers 6 and 7, and fed into the screw conveyor 9 by the screwfeeders 8.

After the dewatered sludge 4 and auxiliary material 5 are kneaded by the kneading machine 10 into which they are conveyed by the screw conveyor 9, a flaky solid fuel 12 is obtained. The solid fuel 12 is fed into the storage vessel 13 by the belt conveyor 11.

The solid fuel has high calorific properties because of including cellulose, and has high inflammability because of its content of flammable liquid and low water content.

Figure 2:
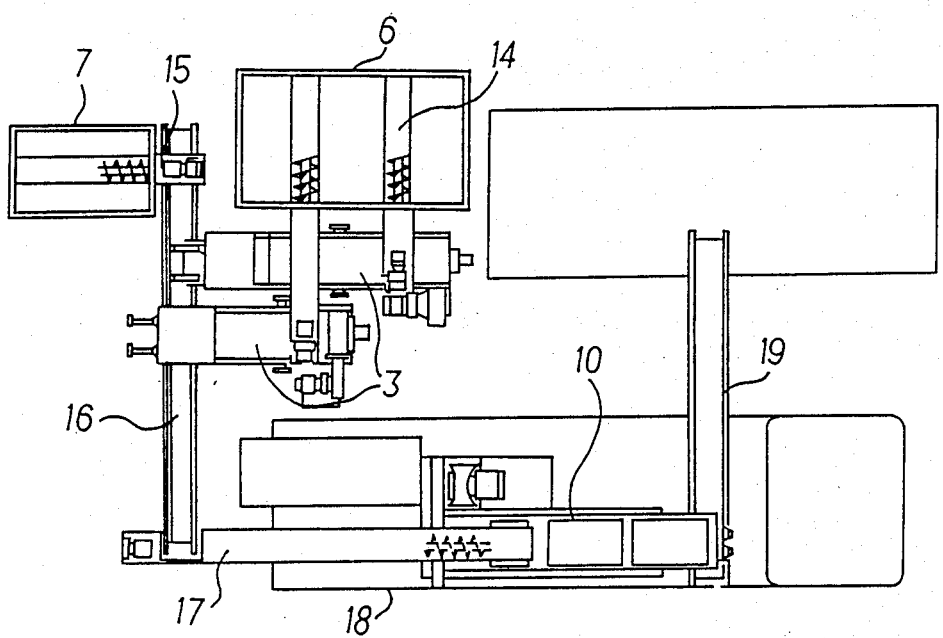

Referring now to FIG. 2, there is illustrated another embodiment of an apparatus for manufacturing solid fuel 1 relating to the present invention.

Two dryers 3, 3 are connected with each of two screw conveyors 14 which is comprised under a hopper 6 feeding main raw material 2.

An impeller breaker 15 is provided under the hopper 7 feeding auxiliary material 5.

A series of belt conveyors 16 is provided fronting on each outlet of the two dryers 3, 3 and the impeller breaker 15.

The carrier starting end of a lift conveyor 17 is connected orthogonally to the carrier termination of a belt conveyor 16 in order to be attachable or removable with freedom.

The carrier termination of the lift conveyor 17 is connected with a kneading machine 10 on a vehicle 18.

A release chute 19 is connected to the kneading machine 10.

Accordingly, the lift conveyor 17, the kneading machine 10 and the release chute 19 are movable, because they are located on the vehicle 18.

As a kneading machine 10, a moistener kneading machine is desirably utilized to prevent solid fuel from flying.

This other embodiment of the apparatus for manufacturing solid fuel will be now explained.

After the main raw material 2 which is thrown into the hopper 6 feeding main raw material 2 is treated for dewatering by two dryers 3, dewatered sludge 4 obtained as described above is released onto the belt conveyor 16.

On the other hand, the auxiliary material 5 which is thrown into the hopper 7 feeding auxiliary material 5 is crushed by the impeller breaker 15, and then the crushed auxiliary material 5 is released onto the belt conveyor 16.

Dewatered sludge 4 and crushed auxiliary material 5 (7) are conveyed into the kneading machine 10 from the belt conveyor 16 passing through the lift conveyor 17.

Flaky solid fuel is released from the release chute 19 after kneaded by the kneading machine.

Figure 3:
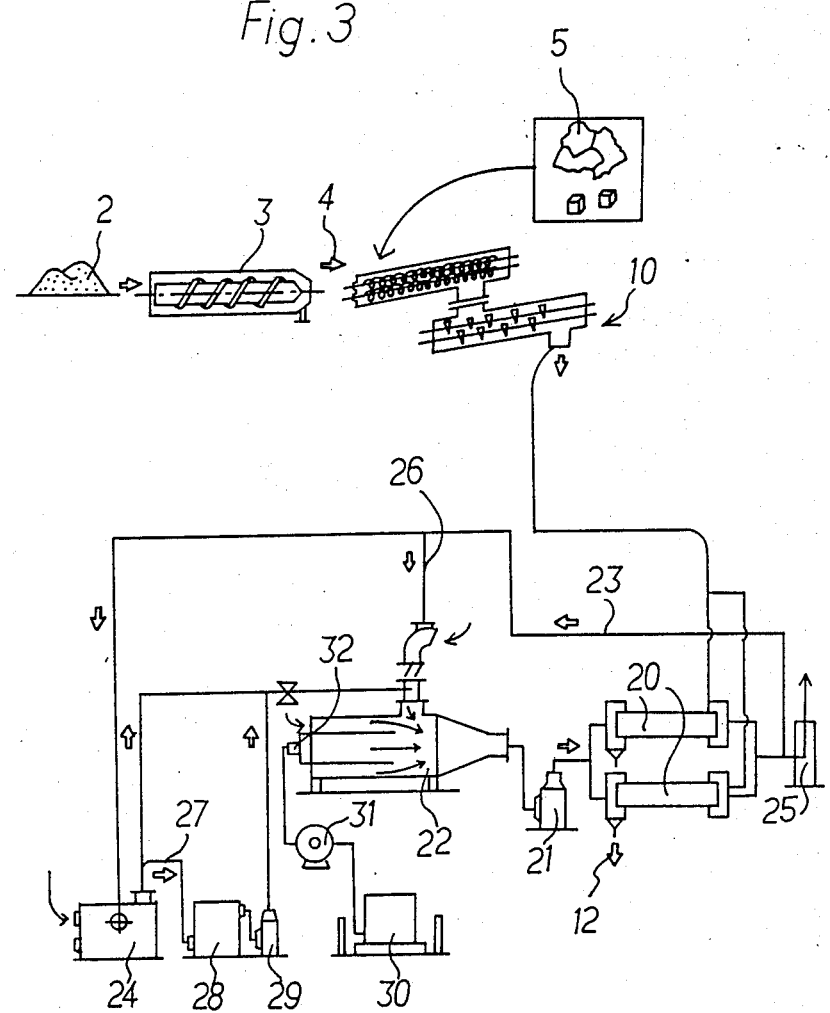

Referring now to FIG. 3, there is illustrated a further embodiment of an apparatus for manufacturing solid fuel 1 relating to the present invention.

Two drying chambers 20 are connected to the kneading machine 10 which is connected to the dryer 3.

As a kneading machine in this embodiment, a double kneading machine is utilized.

Each of the drying chambers 20 is connected to a (hot) blast producer 22, and a hot blast fan 21 is positioned between each of the drying chambers 20 and the hot blast producer 22.

A return line for hot blast 23 connects each of the drying chambers 20 to the hot blast producer 22, making a detour to pass through a combustion furnace for solid fuel 24.

Numeral 25 indicates an alkali cleaning type deodorizing column.

Numeral 26 indicates a bypass return line of hot blast.
Numeral 27 indicates a bypass line of tempered air.
Numeral 28 indicates a small boiler.
Numeral 29 indicates a suction fan.
Numeral 30 indicates an oil tank.
Numeral 31 indicates a pump to provide a burner 32 with oil.

The process of this further embodiment of the apparatus for manufacturing solid fuel 1 will be now explained.

Dewatered sludge 4, which is obtained by treating main raw material 2 for dewatering by the dryer 3, and auxiliary material 5 are thrown into the kneading machine 10 to obtain kneaded material.

Subsequently, flaky solid fuel 12 is obtained after drying of the kneaded material by two drying chambers 20.20.

In this process, after the hot blast, which is produced in the hot blast producer 22, dries the kneaded material in the two drying chambers 20, the cooled down blast which heated the kneaded material gets heat in the combustion furnace for solid fuel 24 and returns back to the hot blast producer 22 after passing through the return line of hot blast 23.

Besides, if the temperature of the hot blast after drying the kneaded material drops only a small amount, it is desirable that the hot blast after drying the kneaded material should return back to the hot blast producer 22 directly passing through the bypass return line of hot blast 26.

On the other hand, if the temperature of the hot blast after drying the kneaded material drops considerably, it is desirable that the hot blast after drying the kneaded material should return back to the hot blast producer 22 from the combustion furnace for solid fuel 24 after getting heat in the small boiler 28 by passing through the bypass line of tempered air 27.

By utilizing this apparatus for manufacturing solid fuel 1, solid fuel is obtained at a low in cost, which is low water content.

Figure 4:
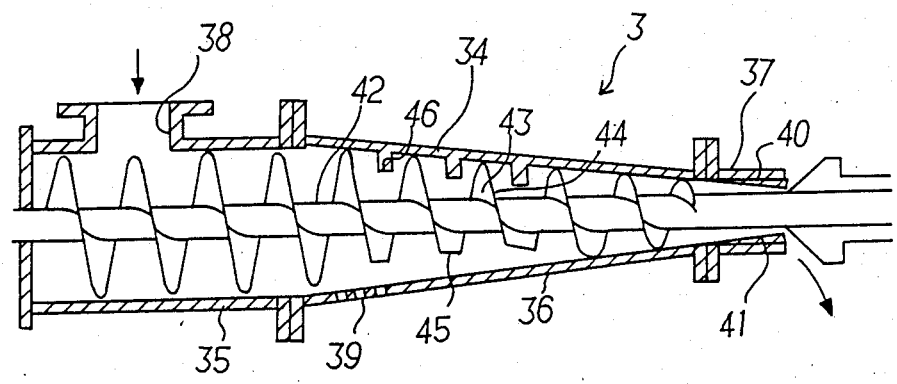

Referring now to FIG. 4, there is illustrated the dryer 3 which is utilized in each embodiment of the apparatus for manufacturing solid fuel 1 relating to the present invention.

This dryer 3 includes a screw press.

Numeral 34 indicates a casing.

The casing 34 is composed of a metering section in the beginning 35, a section for squeezing out water in the middle 36 and a exhaust section in the end 37.

The metering section 35 is formed in a constant diameter, and an entrance for charging 38 is formed in the upper part thereof.

The section for squeezing out water 36 in formed to be tapered in diameter, and many holes for squeezing out water 39 are provided in the periphery thereof.

The exhaust section is comprised of a cylindrical outer tube 40 and a tapering inner tube 41.

A revolving shaft 42 includes along the center in the casing 34.

The revoluing shaft 42 is comprising a spiral impeller 43 whose radius is tapered to the end along the inside of the casing 34.

A partially cut off section 45 is formed at the head edge 44 of the spiral impeller 43.

Some baffle plates 46 may be provided on the inside of the casing 34 toward the partially cut off section 45.

The process of dewatering the main raw material 2 by this dryer 3 will be now explained.

The main raw material 2 released into the entrance for charging 38 is fed into the section for squeezing out water 36 after collecting in the metering section 35.

In the section for squeezing out water 36, the compression pressure produced by the rotation of the spiral impeller 43 squeezes the water from the main raw material out through the holes 39.

The main raw material squeezed out water is squeezed still more by the compression pressure produced by the inner tube 41 of the exhaust section 37.

In the process of dewatering in the section for squeezing out water 36, the main raw material 2 is churned and dewatered equally as a whole by the action of the partially cut off section 45 and the baffle plates 46.

By utilizing this dryer 3, equally churned and dewatered sludge cakes whose water content is less than 40% by weight is obtained from the pulp sludge whose water content is more than 80% by weight.

Having described our invention as related to the embodiments shown in the accompanying drawings, it is our intention that the invention be not limited by any of the details of description, unless otherwise specified, but rather be construed broadly within the spirit and scope set out in the accompanying claims.

What I claim is:

1. An apparatus for manufacturing solid fuel from industrial waste comprising:
   means for providing dewatered main raw material comprising means for receiving main raw material in the form of a sludge of a combustible material of high calorific content having a high water content, an for providing main raw material having reduced water content;
   means for providing auxiliary material;
   means for receiving quantities of said dewatered main raw material and said auxiliary material from respective providing means and for kneading said materials together such that a flaky solid fuel is obtained.

2. An apparatus as recited in claim 1, wherein said means for providing auxiliary material provides a flammable liquid.

3. An apparatus as recited in claim 1, wherein said means for providing auxiliary material provides a solid flammable material and includes means for crushing said auxiliary material provided to said receiving means.

4. An apparatus as recited in claims 1, 2 or 3, further comprising means for receiving said flaky solid fuel from said kneading means and for drying said fuel by a hot blast.

5. An apparatus as recited in claim 1, 2 or 3, wherein said means for providing dewatered main raw material is a screw press including a spiral impeller having a partially cut-off section within a casing, and wherein baffle plates are provided in said casing adjacent said partially cut-off section.

6. An apparatus as recited in claim 1, 2 or 3, wherein said means for receiving and kneading said materials is movable with respect to both of said means for providing material.

* * * * *